United States Patent [19]

Kempter et al.

[11] 4,427,514
[45] * Jan. 24, 1984

[54] POLYADDUCT/POLYCONDENSATE WHICH CONTAINS BASIC NITROGEN GROUPS, AND ITS USE

[75] Inventors: Fritz E. Kempter, Mannheim; Eberhard Schupp, Schwetzingen, both of Fed. Rep. of Germany

[73] Assignee: BASF Aktiengesellschaft, Fed. Rep. of Germany

[*] Notice: The portion of the term of this patent subsequent to Jul. 20, 1999 has been disclaimed.

[21] Appl. No.: 388,514

[22] Filed: Jun. 15, 1982

[30] Foreign Application Priority Data

Jun. 19, 1981 [DE] Fed. Rep. of Germany ....... 3124089

[51] Int. Cl.³ ............................................ C08G 59/54
[52] U.S. Cl. ................. 204/181 C; 525/504; 528/99; 528/100; 528/107
[58] Field of Search ................. 525/504; 528/99, 100, 528/107; 204/181 C

[56] References Cited

U.S. PATENT DOCUMENTS

| | | | |
|---|---|---|---|
| 3,839,252 | 10/1974 | Bosso et al. | 260/29.2 EP |
| 4,269,742 | 5/1981 | Goeke et al. | 528/99 X |
| 4,336,116 | 6/1982 | Schupp et al. | 528/99 X |
| 4,340,455 | 7/1982 | Kempter et al. | 528/99 X |
| 4,340,714 | 7/1982 | Kempter et al. | 528/99 X |

FOREIGN PATENT DOCUMENTS

| | | |
|---|---|---|
| 2357075 | 11/1973 | Fed. Rep. of Germany . |
| 2419179 | 4/1974 | Fed. Rep. of Germany . |
| 2457437 | 12/1974 | Fed. Rep. of Germany . |
| 2606831 | 2/1976 | Fed. Rep. of Germany . |
| 2541234 | 4/1976 | Fed. Rep. of Germany . |
| 2711385 | 8/1976 | Fed. Rep. of Germany . |
| 2711425 | 3/1977 | Fed. Rep. of Germany . |
| 2755906 | 12/1977 | Fed. Rep. of Germany . |
| 2603666 | 9/1978 | Fed. Rep. of Germany . |

*Primary Examiner*—Earl A. Nielsen
*Attorney, Agent, or Firm*—Keil & Witherspoon

[57] ABSTRACT

Polyadducts/polycondensates which can be diluted with water when protonated with an acid and which contain basic nitrogen groups are obtained by the polyaddition reaction of (A) a Mannich base obtained from a monophenol and/or a polyphenol, one or more secondary amines which contain one or more hydroxyalkyl groups, or a mixture of a secondary amine of this type with another secondary amine, and formaldehyde with (B) one or more epoxy resins, and contain groups, which are bonded to aromatic rings, of the formula (I)

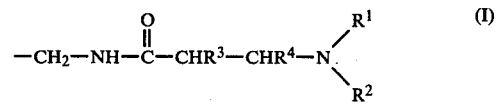

where $R^1$ and $R^2$ are each alkyl of 1 to 9 carbon atoms, or hydroxyalkyl or alkoxyalkyl, each of 2 to 10 carbon atoms, or are linked to one another to form a 5-membered or 6-membered ring, and $R^3$ and $R^4$ are each hydrogen or methyl.

These products are useful as binders for cathodic electrocoating.

7 Claims, No Drawings

POLYADDUCT/POLYCONDENSATE WHICH CONTAINS BASIC NITROGEN GROUPS, AND ITS USE

The present invention relates to polyadducts/polycondensates which can be diluted with water when protonated with an acid, contain basic nitrogen groups, and are obtained from a Mannich base and an epoxy resin, and to their use for cathodic electrocoating.

German Patent No. 2,357,075, German Published Application DAS No. 2,419,179 and German Laid-Open Application DOS No. 2,755,906 disclose surface coating binders which are obtained by the polyaddition reaction of a Mannich base with an epoxy resin, the Mannich bases used being condensates of a condensed phenol containing two or more phenolic hydroxyl groups per molecule, a secondary amine containing a hydroxyalkyl group, and formaldehyde.

The binders described in the above publications give excellent coatings when applied cataphoretically onto metal components from surface coating baths having a relatively high pH (above 7.0), but possess certain weaknesses in respect of their shelf life and bath stability, and release undesirably large amounts of alkylamine during hardening of the coatings.

It is an object of the present invention to provide polyadducts/polycondensates which contain basic nitrogen groups and do not have the above disadvantages, or at least represent a substantial improvement.

We have found that this object is achieved by using, for the synthesis of the polyadducts/polycondensates, at least in part a mononuclear or polynuclear monophenol and/or polyphenol which contains groups of the general formula (I)

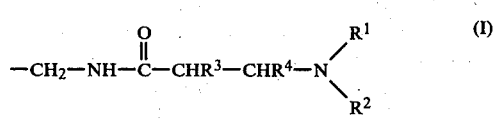

The present invention relates to polyadducts/polycondensates which can be diluted with water when protonated with an acid, contain basic nitrogen groups, and are obtained by the polyaddition reaction of (A) from 5 to 90% by weight of a Mannich base obtained from
  (a) a monophenol and/or a polyphenol,
  (b) one or more secondary amines ($b_1$) which contain one or more hydroxyalkyl groups, or a mixture of a secondary amine of this type ($b_1$) with another secondary amine ($b_2$), and
  (c) formaldehyde or a formaldehyde donor, with
(B) from 10 to 95% by weight of one or more epoxy resins, wherein the polyadduct/polycondensate of (A) with (B) contains groups, which are bonded to aromatic rings, of the formula (I)

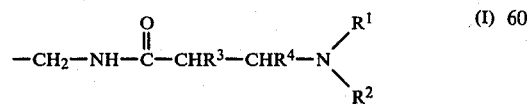

where $R^1$ and $R^2$ are identical or different and are each alkyl of 1 to 9 carbon atoms, or hydroxyalkyl or alkoxyalkyl, each of 2 to 10 carbon atoms, or are linked to one another to form a 5-membered or 6-membered ring, and $R^3$ and $R^4$ are identical or different and each is hydrogen or methyl.

Preferably, the monophenols and/or polyphenols used to prepare the Mannich base (A) comprise
($a_1$) one or more mononuclear or polynuclear monophenols and/or polyphenols, some or all of which are replaced by
($a_2$) a mononuclear or polynuclear monophenol and/or polyphenol which contains groups of the general formula (I)

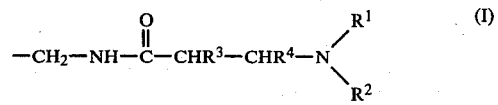

where $R^1$, $R^2$, $R^3$ and $R^4$ have the above meanings.

Further preferred polyadducts/polycondensates are those for which reaction products of polyepoxy compounds with less than the equivalent amounts of mononuclear or polynuclear mono- and/or polyphenols ($a_2$) have been used as component (B).

Preferably, also, diethanolamine is used as component ($b_1$), or a mixture of diethanolamine ($b_1$) and another secondary amine is used as component ($b_2$), and a reaction product of a mononuclear or polynuclear monophenol and/or polyphenol with N-methylolacrylamide or N-methylolmethacrylamide (where an addition reaction of the secondary amine at the carbon-carbon double bond of the acrylamide or methacrylamide takes place) is used as component ($a_2$).

The present invention also relates to the use of these polyadducts/polycondensates as binders for the cathodic electrocoating of metallic articles.

The novel polyadducts/polycondensates possess a shelf life and a bath stability which are substantially better than those of the surface-coating binders described in the above German Patent, German Published Application and German Laid-Open Application and in German Laid-Open Application DOS No. 2,755,906, and release a smaller amount of dialkylamine when alkanolamine-modified Michael adducts are used.

It may be stated in connection with the introduction of the groups of the general formula (I) that secondary amines undergo a Michael addition reaction at the C—C double bonds of the group

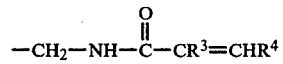

advantageously prior to the Mannich reaction, thereby virtually completely consuming the carbon-carbon double bonds.

It is however also possible, for example, to follow the Tscherniac-Einhorn reaction of acrylamide or methacrylamide with the Michael addition reaction and then to react the phenolic groups of the resulting reaction product with an excess of polyepoxide, after which the epoxide groups remaining in the product thus obtained are reacted with a Mannich base.

It is also possible to use the above route to prepare products of (A) and (B) which contain the group

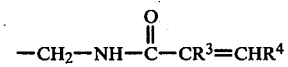

However, this route is less advantageous, since the reaction with an amine, which may be present in particular during the preparation or in the surface coating baths as, for example, diethanolamine, may occur.

In general, a polycondensation always precedes the polyaddition reaction.

The following details may be noted concerning the components which make up the polyadducts/polycondensates according to the invention:

(A) Preparation of the Mannich base (a) Suitable monophenols and/or polyphenols (a) or (a₁) are the conventional monophenols or polyphenols which are in particular mononuclear or polynuclear, for example phenol, its monoalkyl and dialkyl derivatives, where alkyl is of 1 to 18 carbon atoms, eg. o-cresol, p-cresol and p-tert.-butylphenol, naphthols, eg. α-naphthol and β-naphthol, ®Cardanol, and in particular polyhydric phenols containing one or more aromatic radicals, preferably bisphenol A or novolacs, indane derivatives, as described in U.S. Pat. No. 2,989,534, which quite generally contain phenol groups

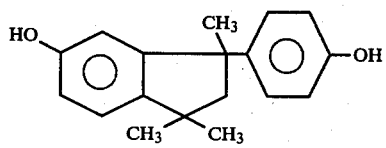

cumarone and indene resins which contain phenol groups, and butadiene and isoprene homopolymers or copolymers which contain phenol groups, for example as described in German Laid-Open Application DOS No. 2,755,906, and polyphenols containing ether groups, as described in German Published Application DAS No. 2,419,179.

Particularly suitable components (a) are phenols of the general formula

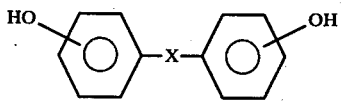

where the OH groups are in the ortho and/or para-position to X, and X is a straight-chain or branched divalent aliphatic radical of 1 to 3 carbon atoms, or is $>SO_2$, $>SO$, $>S$, $>C=O$ and $—O—$; a preferred compound is bisphenol A. The alkyl derivatives of these polynuclear phenols may also be used.

A Mannich condensation product obtained from one or more phenols and/or alkylphenols, a primary amine and formaldehyde or a formaldehyde donor, as described in German Laid-Open Application DOS No. 2,711,385, is also suitable as component (A) for the preparation of the novel surface coating binder.

Suitable phenols for the preparation of these last-mentioned Mannich condensation products are phenol or alkylphenols, preferably monoalkylphenols, where alkyl is straight-chain, branched or cyclic and of 1 to 18, in particular 3 to 12, carbon atoms, eg. hexylphenol, nonylphenol, dodecylphenol and tert.-butylphenol. Nonylphenol (also including, for example, technical-grade nonylphenol containing 85% of 4-nonylphenol), and p-tert. butylphenol, and mixtures of these alkylphenols with phenol are also suitable. 3-Alkenylphenols, for example ®Cardanol, which can be obtained from cashew nut shell oil and which is stated to consist essentially of 3-(pentadeca-8,11-dienyl)-phenol, are also suitable. Some of the unsubstituted phenol may also be replaced by bisphenol A. Suitable primary amines are monoalkylamines where alkyl is straight-chain, branched or cyclic and of 2 to 13, preferably 2 to 6, carbon atoms, eg. butylamine, hexylamine or octylamine, and hydroxyl-substituted and alkoxy-substituted monoalkylamines, such as monoethanolamine, monoisopropanolamine and 2-alkoxyethylamines, eg. 2-methoxyethylamine and 2-ethoxyethylamine and mixtures of these amines.

To prepare these Mannich condensates, usable as component (a), the alkylphenol, primary amine and formaldehyde or formaldehyde donor are advantageously reacted in amounts which provide not less than 1 mole of the primary amine and not less than 2 moles of formaldehyde per 2 moles of phenol or alkylphenol.

(a₂) Component (a₂) is a mononuclear or polynuclear monophenol and/or polyphenol which contains groups of the general formula (I)

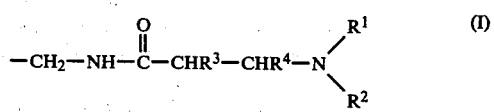

where $R^1$ and $R^2$ are identical or different and are each alkyl of 1 to 9 carbon atoms, or hydroxyalkyl or alkoxyalkyl, each of 2 to 10 carbon atoms, or are linked to one another to form a 5-membered or 6-membered ring, and $R^3$ and $R^4$ are identical or different and each is hydrogen or methyl. Groups of the general formula I are generally introduced by the acid-catalyzed Tscherniac-Einhorn reaction of a phenol with an N-methylolamide of acrylic or methacrylic acid, the reaction being carried out in general at from 30° to 150° C., preferably from 50° to 120° C. The subsequent Michael addition is preferably carried out at from 70° to 120° C.

The incorporation of the group (I) in conjunction with the presence of o-alkanolamino-(alkylamino)-methylphenol groups makes it possible to effect cross-linking other than that which is conventional for Mannich bases.

(b) Suitable secondary amines (b₁) are those containing one or more hydroxyalkyl groups, or mixtures of (b₁) with other secondary amines (b₂) which are free of hydroxyalkyl groups.

Examples of suitable secondary amines (b₁) containing one or more hydroxyalkyl groups are alkylethanolamines or alkylisopropanolamines where alkyl is of 1 to 6 carbon atoms. However, dialkanolamines, in particular diethanolamine, and mixtures of these (di)alkanolamines with other secondary amines (b₂) are preferred.

The secondary amines (b₁), which are incorporated into the Mannich bases (A) as diethanolaminomethyl or alkylethanolaminomethyl groups, are very important in determining the degree of dispersibility of the binders over the desired pH range of from 6.0 to 10.0, and in part in respect of the crosslinking of the system.

Suitable secondary amines (b₂), which may or may not be employed in addition to the amines (b₁), which contain hydroxyalkyl groups, for the preparation of the Mannich bases (A), are those of the general formula

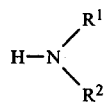

where $R^1$ and $R^2$ are identical or different and each is a straight-chain or branched aliphatic radical of 1 to 9, preferably 3 to 8, carbon atoms, or alkoxyalkyl of 2 to 10 carbon atoms, or $R^1$ and $R^2$ are linked to one another to form a 5-membered or 6-membered ring. Examples of suitable secondary amines ($b_2$) of this type are di-n-butylamine, di-n-propylamine, diisopropylamine, di-n-pentylamine, di-n-hexylamine, di-n-octylamine, di-2-ethylhexylamine, di-2-alkoxyethylamines, eg. di-2-methoxy-, di-2-ethoxy- and di-2-butoxyethylamine, piperazines, eg. N-hydroxyethylpiperazine, morpholine and piperidine, and preferably also N,N,N'-trimethylalkylenediamines.

The secondary amines (b) are used both in the preparation of the Mannich bases and also in the Michael addition reaction, amines ($b_1$), in particular diethanolamine, being preferred in this case.

Of these secondary amines which may or may not be present, di-n-butylamine, di-n-hexylamine and di-n-octylamine, di-2-ethylhexylamine and di-2-alkoxyethylamines and their mixtures are again preferred. These secondary amines ($b_2$) mainly influence the stability characteristics of the binder, but they also affect the leveling and inner plasticization of the surface coatings produced with the binders.

(c) The formaldehyde or formaldehyde donor is preferably used in the form of a solution of formaldehyde or paraformaldehyde, or a mixture thereof, in an alcohol, for example in butanol.

The Mannich bases (A) are prepared in accordance with the conventional methods described in the literature, for example in Houben-Weyl, Methoden der organischen Chemie, Volume XI/1, page 731, 1957. The solvent is chosen in accordance with the different polarity conditions. It is advantageous to use higher alcohols, cycloaliphatics or alkylaromatics together with polar solvents.

The starting materials are employed in ratios which depend on the particular properties which the end product is to have; the weight ratio of component ($a_1$) to component ($a_2$) is from 1:0.1 to 1:15, preferably from 1:0.5 to 1:10, and the weight ratio of the secondary hydroxyl-containing amines ($b_1$) to other secondary alkylamines ($b_2$) is from 1:0 to 1:3.

The ratio of the starting materials ($a_1$), ($a_2$) and (b) for the preparation of component (A) is advantageously such as to provide from about 0.3 to 2.0, preferably from 0.5 to 1.5, molecules of component (b) per phenolic hydroxyl group of the mixture of components ($a_1$) and ($a_2$).

Not less than 1 mole of (c) is used per mole of (b) in the preparation of the Mannich bases (A).

The properties of the novel polyadducts/polycondensates, especially the properties of the electrocoating bath and of the coatings obtained, can be varied as desired by varying the ratios of the secondary amines. Thus, the dispersibility of the binder, the reactivity, the leveling characteristics, the crosslinking, the resilience of the coating and the corrosion protection it affords depend on the chosen ratio of diethanolamine or alkylethanolamine to di-n-butylamine, di-n-hexylamine, di-2-ethylhexylamine, di-n-octylamine and di-2-alkoxyethylamine.

In a particularly preferred embodiment of the present invention, the preparation of the Mannich base is carried out with a formaldehyde donor, for example paraformaldehyde, in an amount which is virtually equivalent to the amine component used and is in general not more than 25% in excess thereof, in an alcohol, such as isopropanol or isobutanol, and component (A) is reacted directly, ie. without any subsequent reaction with further formaldehyde, with component (B).

In general, the reaction of component (A) with component (B) is controlled so that the novel polyadducts/polycondensates formed have mean molecular weights from 800 to 5,000, preferably from 1,000 to 3,000, and terminal phenolic groups, ie. (di)alkanolaminomethylphenol or dialkylaminomethylphenol groups, are present. Preferably, the binders contain from about 0.5 to 7.5% by weight of diethanolamine, incorporated as the dialkanolaminomethylphenol group.

The reaction of component (A) with component (B) is in general carried out at from 20° to 100° C., preferably from 60° to 100° C., particularly preferably from 70° to 80° C., in an organic solvent, for example an alcohol of 3 to 15 carbon atoms, a glycol ether, an alkylaromatic, eg. toluene, etc., or a cycloaliphatic.

To prepare the novel electrocoating binders, from 5 to 90% by weight, preferably from 15 to 60% by weight, of the Mannich condensate (A) are reacted with from 10 to 95% by weight, preferably from 30 to 85% by weight, of epoxy resin (B), and component ($a_2$) may be present during the preparation of component (A) or may be added only after the preparation of component (A). The degree of etherification of the phenolic components ($a_1$ and $a_2$) with the epoxy resin (B) can be used to vary, in particular, the stability, and also other important properties, for example the electrical breakdown strength.

If the reaction is carried out in the presence of a small amount of a tertiary amine which can be quaternized, ie. one which contains one or more methyl groups, the product obtained contains a quaternary ammonium group, and this may be desirable for increasing the pH of the electrocoating bath produced.

Suitable epoxy resins are the conventional polyepoxide compounds, preferably polyepoxide compounds having 2 or 3 epoxide groups in the molecule, for example reaction products of polyhydric phenols, especially those of the formula mentioned under ($a_1$), namely

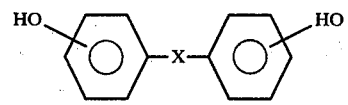

with epichlorohydrin, but also the above reaction products of polyhydric alcohols, for example pentaerythritol, trimethylolpropane or glycerol, with epichlorohydrin. Suitable products can be derived from any diol or polyol, which may or may not contain ether groups, and after introduction of the glycidyl radical the product may still contain some free alcoholic OH groups or be entirely devoid of such groups. Reaction products, still containing epoxide groups, of epoxy resins with primary or secondary amines or with hydroxyl-containing glycol ethers may also be used, as may epoxy resins which contain hetero-atoms, such as sulfur. Epoxy resins containing blocked urethane groups, as described in German Laid-Open Application DOS No. 2,554,080 and DOS No. 2,541,801, are also suitable. Quite generally, all resins which contain 1,2-epoxide groups and are derived from polyacrylate, polyether, polyester or polyurethane resins, or from polybutadiene oils or other oils, may also be used.

Other suitable compounds derived from resins and containing epoxide groups are nitrogen-containing di-epoxides, as described in U.S. Pat. No. 3,365,471, epoxy resins derived from 1,1-methylene-bis-(5-substituted hydantoin), as described in U.S. Pat. No. 3,391,097, di-epoxides of bis-imides as described in U.S. Pat. No. 3,450,711, epoxidized aminomethyl-diphenyl oxides as described in U.S. Pat. No. 3,312,664, aliphatic and heterocyclic N,N'-diglycidyl compounds, for example as described in U.S. Pat. No. 3,503,979, aminoepoxyphosphonates as described in British Pat. No. 1,172,916, 1,3,5-triglycidyl isocyanurates and further materials, containing epoxide groups, known in the art.

In order to achieve the higher functionality of component (B) which is preferred for resin formation from components (A) and (B), component (B) can, if desired, be reacted with a diisocyanate, eg. hexamethylene diisocyanate or toluylene diisocyanate, or with a polyisocyanate. For example, epoxide compounds which in addition to an epoxide group contain other functional groups, for example OH groups, can be reacted with diisocyanates. Where appropriate, the epoxy resins can be reacted further with partially blocked diisocyanates and polyisocyanates.

The novel polyadduct/polycondensate is prepared from components (A) and (B) preferably using amounts such as to provide from 0.1 to 0.9 epoxide group per phenol molecule; it is substantially free from epoxide groups and in particular should, at the use stage, not contain more than 0.25 epoxide group per molecule of the product. Excess epoxide groups present after the preparation of the binder can, where necessary, be removed by reaction with mercaptans and/or acids.

The novel polyadduct/polycondensate (solid resin) in general contains from 0.5 to 25, preferably from 2.5 to 15, % by weight of the group of the formula (I).

Suitable additives to the novel polyadducts/polycondensates include polybutadiene oils and other hydrocarbon oils, as well as compounds containing blocked urethane groups, as described, for example, in German Laid-Open Application DOS Nos. 2,711,425 and DOS 2,755,907. The binders described in German Laid-Open Application DOS No. 2,606,831 may also be used as additives.

The polyadducts/polycondensates according to the invention can be diluted with the conventional surface-coating solvents, such as alcohols of 4 to 16 carbon atoms, eg. isopropanol, decanol, n-butanol and isobutanol, alkylaromatics, eg. toluene, and cycloaliphatics, or with aqueous organic solvents or solvent mixtures, and are applied, with or without admixture of pigments, fillers and conventional assistants, to the substrate to be coated, for example to wood, metal, glass or ceramic, by conventional surface-coating methods, such as spraying, dipping or flooding; the coating is then dried and hardened at above 170° C. The coatings thus obtained possess, for example, great hardness and resistance to solvents.

Preferably, however, the novel surface-coating binders are employed protonated with acids, for example phosphoric acid and its derivatives or, preferably, watersoluble carboxylic acids, eg. acetic acid, formic acid or lactic acid. The protonated surface-coating binder can be diluted with water and can be applied using the conventional coating methods mentioned above, again giving coatings having very useful properties. However, the degree of protonation should be kept as low as possible.

The preferred use of the protonated surface-coating binders according to the invention is the cathodic electrocoating of electrically conductive substrates, for example metal articles, sheets and the like made of brass, copper, aluminum, iron or steel, which may or may not be chemically pretreated, for example phosphatized.

The aqueous solutions or dispersions of the novel surface-coating binders, some or all of which are in the form of a salt of a water-soluble carboxylic acid, also contain, as a mixture with these binders, assistants which can be cataphoretically deposited such as pigments, soluble dyes, solvents, flow improvers, stabilizers, hardening catalysts, especially manganese or cobalt naphthenates or octoates which accelerate hardening, and also metal salts of the prior art, as disclosed in, for example, German Laid-Open Application DOS No. 2,541,234 and DOS No. 2,457,437, but in particular the $Cu^{++}$ ion, which is capable of complex formation with the novel binder, anti-foams and other additives and assistants.

The novel surface-coating binders can be used both as the principal base resin for electrocoating and as the base resin in the pigment paste. Alternatively, the resin can be used as the principal base resin for the electrocoating composition, in combination with a conventional pigment paste, or can be used as the base resin in a pigment paste, in combination with a conventional polyamine-containing base resin for the cathodic electrocoating process. The amine-containing cationic electrocoating resins are known and do not require detailed description here. Examples of suitable resins include resins containing tertiary amine salts, as disclosed in German Laid-Open Application DOS No. 2,603,666, and resins containing quaternary ammonium groups, as described in U.S. Pat. No. 3,839,252.

For cathodic electrocoating, the solids content of the electrocoating bath is in general brought to 5-20% by weight by dilution with demineralized water. The deposition is in general carried out at from 15° to 40° C. for a period of from 1 to 2 minutes at a bath pH of from 5.0 to 8.5, preferably from 6.0 to 7.5, at a deposition voltage of from 50 to 500 volt. After the film which has been cathodically deposited on the electrically conductive article has been rinsed, the self-crosslinking binder is hardened for about 10-30 minutes at about 150°-220° C., preferably for about 20 minutes at 170°-200° C.

The novel polyadducts/polycondensates, when used for cathodic electrocoating, give coatings having excellent mechanical properties, such as great hardness and scratch resistance, coupled with very good resilience and firm adhesion to the substrate.

Furthermore, the coatings obtained have good solvent resistance and resistance to the salt spray test.

In the Examples, parts and percentages are by weight, unless stated otherwise.

EXAMPLE 1

(a) Preparation of an intermediate containing ether groups and phenol groups 210 parts of 4-vinylcyclohexane dioxide (for example ERL 4206 from UCC) and 500 parts of bisphenol are stirred for 1.5 hours at 180° C. under a stream of nitrogen, and the mixture is then diluted with 380 parts of toluene. The solids content of the mixture is 67%.

(b) Tscherniac-Einhorn/Michael reaction 434.3 parts of the product prepared as described under (a), 136.5 parts of acrylamide, 79.7 parts of paraformaldehyde, 91 parts of p-tert.-butylphenol, 0.4 part of phenothiazine and 78 parts of bisphenol A are brought into solution at 115° C. The solution is cooled to 60° C. and 1 part of boron trifluoride ethyl etherate is added. After reaction for 30 minutes at 60° C., a further 1 part of boron trifluoride ethyl etherate is added, followed by a further 0.7 part after another 30 minutes at 60° C. The mixture is allowed to continue reacting for a further 3 hours at 60° C., and water is then eliminated at 120° C. Thereafter, 202 parts of diethanolamine are added dropwise at 90° C., and the mixture is allowed to continue reacting for a further 2 hours at 90° C., and is then diluted with 29.4 parts of isobutanol, 29.4 parts of isopropanol, 110 parts of ethylglycol and 110 parts of butylglycol. The solids content is 58.9%.

(c) Preparation of the electrocoating binder 288.1 parts of the product prepared as described under (b), 125 parts of bisphenol A, 33.5 parts of paraformaldehyde, 37.5 parts of diethanolamine, 40 parts of dibutylamine, 50 parts of dihexylamine and 25 parts of isobutanol are stirred for 15 minutes at 50° C. and then for 2.5 hours at 80° C. 137.3 parts of a diglycidyl ether obtained from bisphenol A and epichlorohydrin, and having an epoxide value of 0.2, 54.7 parts of a triglycidyl ether obtained from pentaerythritol and epichlorohydrin, and having an epoxide value of 0.62, and 50 parts of isobutanol are then added. The mixture is allowed to continue reacting at 70° C. until the viscosity reaches 680 mPa.s (measured by means of an ICI plate-and-cone viscometer from Epprecht, at 75° C.). Finally, the mixture is diluted with 50 parts of isobutanol to give a solids content of 74.1%.

(d) Electrocoating and testing

To prepare a 10% strength coating bath, 100 parts of the solid resin prepared as described under (c), 80 ppm of $Cu^{++}$ (based on bath volume) as a copper acetate solution and 1 part of Co-Soligen ® (from Hoechst AG; Co content 8% by weight) are mixed thoroughly, protonation is effected with 1.8% of acetic acid, and the mixture is made up to 1,000 parts with fully demineralized water. The coating bath is then stirred thoroughly for 48 hours at 30° C., after which it has a pH of 7.4 and a conductivity of 1,180 $\mu S.cm^{-1}$. Before deposition, 10 parts of isodecanol are stirred in. On phosphatized steel sheets connected as the cathode, deposition for 2 minutes at 85 volt and 30° C., and hardening for 20 minutes at 180° C., gives a smooth 14–16 μm thick coating having an Erichsen deep-drawing value of 8.9 mm.

The DIN 50,021 corrosion test, carried out for 10 days, gave a penetration of 3.4–5.8 mm on phosphatized water-rinsed steel sheets (eg. Bonder ® 125 W from Metallgesellschaft) and a penetration of 0.3–1.2 mm on iron-phosphatized water-rinsed steel sheets (eg. Bonder ® 1041 W), the penetrations being measured from the cut. The loss on baking is about 9%.

EXAMPLE 2

(a) Preparation of an intermediate containing ether groups and phenol groups 420 parts of a triglycidyl ether obtained from pentaerythritol and epichlorohydrin, and having an epoxide value of 0.62, and 73.2 parts of phenol are stirred for 30 minutes at 180° C. Thereafter, 364.6 parts of bisphenol A are added, and the mixture is allowed to continue reacting for a further hour at 180° C. and is then diluted with 420 parts of toluene. The solids content is 67.8%.

(b) Tscherniac-Einhorn/Michael reaction 430 parts of the product prepared as described under (a), 136.5 parts of acrylamide, 79.7 parts of paraformaldehyde, 91 parts of p-tert.-butylphenol, 0.4 part of phenothiazine and 78 parts of bisphenol A are brought into solution at 115° C. The solution is cooled to 60° C. and 1 part of boron trifluoride ethyl etherate is added. After reaction for 30 minutes at 60° C., a further 1 part of boron trifluoride ethyl etherate is added, followed by a further 0.7 part after another 30 minutes at 60° C. The mixture is allowed to continue reacting for a further 3 hours at 60° C., with stirring, and water is then eliminated at 120° C. Thereafter, 202 parts of diethanolamine are added dropwise at 90° C., and the mixture is allowed to continue reacting for a further 2 hours at 90° C., and is then diluted with 29.4 parts of isobutanol, 29.4 parts of isopropanol, 110 parts of ethylglycol and 110 parts of butylglycol. The solids content is 67.3%.

(c) Preparation of the electrocoating binder 252.6 parts of the product obtained as described under (b), 33.5 parts of paraformaldehyde, 125 parts of bisphenol A, 37.3 parts of diethanolamine, 40 parts of dibutylamine, 50 parts of dihexylamine and 60 parts of isobutanol are stirred for 15 minutes at 50° C. and then for 2.5 hours at 80° C. 137.3 parts of a diglycidyl ether obtained from bisphenol A and epichlorohydrin, and having an epoxide value of 0.2, 54.7 parts of a triglycidyl ether obtained from pentaerythritol and epichlorohydrin, and having an epoxide value of 0.62, and 50 parts of isobutanol are then added. The mixture is allowed to continue reacting at 70° C. until the viscosity reaches 1,350 mPa.s (measured by means of an ICI plate-and-cone viscometer at 75° C.). Finally, the mixture is diluted with 50 parts of isobutanol to give a solids content of 73.3%.

(d) Electrocoating and testing

To prepare a 10% strength coating bath, 100 parts of the solid resin prepared as described under (c), 80 ppm of $Cu^{++}$ (based on bath volume) as a copper acetate solution and 1 part of Co-Soligen are mixed thoroughly, protonation is effected with 1.6% of acetic acid, based on solid resin, and the mixture is made up to 1,000 parts with fully demineralized water. The coating bath is then stirred thoroughly for 48 hours at 30° C., after which it has a pH of 7.25 and a conductivity of 1,075 $\mu S.cm^{-1}$. Before deposition, 7.5 parts of isodecanol are stirred in. On phosphatized steel sheets connected as the cathode, deposition for 2 minutes at 85 volt and 30° C., and hardening for 20 minutes at 180° C., give a smooth 14–16 μm thick coating having an Erichsen deep-drawing value of 8.5 mm.

The DIN 50,021 corrosion test, carried out for 10 days, gave a penetration of 1.5–2.8 mm on zinc-phosphatized water-rinsed steel sheets and a penetration of 0.9–1.5 mm on iron-phosphatized water-rinsed steel sheets, the penetrations being measured from the cut. The loss on baking is about 9%.

EXAMPLE 3

(a) Preparation of an intermediate containing ether groups and phenol groups 210 parts of 4-vinylcyclohexene dioxide (for example Bakelite ® epoxy resin ERL 4206 from UCC) and 73.2 parts of phenol are stirred for 30 minutes at 180° C. Thereafter, 364.6 parts of bisphenol A are added, and the mixture is allowed to continue reacting for a further hour at 190° C., and is then diluted with 310 parts of toluene. The solids content is 66.1%.

(b) Tscherniac-Einhorn/Michael reaction 439.6 parts of the product prepared as described under (a), 136.5 parts of acrylamide, 79.7 parts of paraformaldehyde, 91 parts of p-tert.-butylphenol, 0.4 part of phenothiazine and 78 parts of bisphenol A are brought into solution at 115° C. The solution is cooled to 60° C. and 1 part of boron trifluoride ethyl etherate is added. After reaction for 30 minutes at 60° C., a further 1 part of boron trifluoride ethyl etherate is added, followed by a further 0.7 part after another 30 minutes at 60° C. The mixture is allowed to continue reacting for a further 3 hours at 60° C., and water is then eliminated at 120° C. Thereafter, 202 parts of diethanolamine are added dropwise at 90° C., and the mixture is allowed to continue reacting for a further 2 hours at 90° C., and is then diluted with 29.4 parts of isobutanol, 29.4 parts of isopropanol, 110 parts of ethylglycol and 110 parts of butylglycol. The solids content is 59%.

(c) Preparation of the electrocoating binder 288.1 parts of the product prepared as described under (b), 125 parts of bisphenol A, 33.5 parts of paraformaldehyde, 37.3 parts of diethanolamine, 40 parts of dibutylamine, 50 parts of dihexylamine and 25 parts of isobutanol are stirred for 15 minutes at 50° C. and then for 2.5 hours at 80° C. 137.3 parts of a diglycidyl ether (eg. Epoxy 1/33) obtained from bisphenol A and epichlorohydrin, and having an epoxide value of 0.2, 54.7 parts of a triglycidyl ether obtained from pentaerythritol and epichlorohydrin, and having an epoxide value of 0.62, and 50 parts of isobutanol are then added. The mixture is allowed to continue reacting at 70° C. until the viscosity reaches 590 mPa.s (measured by means of an ICI plate-and-cone viscometer at 75° C.). Finally, the mixture is diluted with 50 parts of isobutanol to give a solids content of 73.4%.

(d) Electrocoating and testing

To prepare a 10% strength coating bath, 100 parts of the solid resin prepared as described under (c), 80 ppm of Cu++ (based on bath volume) as a copper acetate solution and 1 part of Co-Soligen are mixed thoroughly, protonation is effected with 1.8 parts of acetic acid, based on solid resin, and the mixture is made up to 1,000 parts with fully demineralized water. The coating bath is then stirred thoroughly for 48 hours at 30° C., after which it has a pH of 7.45 and a conductivity of 1,158 $\mu$S.cm$^{-1}$. Before deposition, 10 parts of isodecanol are stirred in. On phosphatized steel sheets connected as the cathode, deposition for 2 minutes at 110 volt and 30° C., and hardening for 20 minutes at 180° C., give a smooth 14–15 $\mu$m thick coating having an Erichsen deep-drawing value of 8.2 mm. The DIN 50,021 corrosion test, carried out for 10 days, gave a penetration of 2.3–3.3 mm of zinc-phosphatized water-rinsed steel sheets and a penetration of 0.6–2.4 mm on iron-phosphatized water-rinsed steel sheets, the penetrations being measured from the cut. The loss on baking is about 9%.

EXAMPLE 4

(a) Tscherniac-Einhorn reaction of an indene resin containing 6.1% of phenolic OH groups (from Rüttgerswerke G)

357.3 parts of the above indene resin, 91 parts of acrylamide, 53.1 parts of paraformaldehyde, 0.2 part of phenothiazine and 62 parts of toluene are brought into solution at 115° C. The solution is cooled to 60° C. and 0.7 part of boron trifluoride ethyl etherate is added. After reaction for 30 minutes at 60° C., a further 0.7 part of boron trifluoride ethyl etherate is added, followed by a further 0.4 part after another 30 minutes at 60° C. The mixture is allowed to continue reacting for a further 3 hours at 60° C., and water is then eliminated at 120° C. Thereafter, 134.6 parts of diethanolamine are added dropwise at 90° C., and the mixture is allowed to continue reacting for a further 2 hours at 90° C., and is finally diluted with 50 parts of isopropanol and 50 parts of isobutanol. The solids content is 81.6%.

(b) Preparation of the electrocoating binder 205.8 parts of the product obtained as described under (a), 82.5 parts of bisphenol A, 26.7 parts of paraformaldehyde, 29.9 parts of diethanolamine, 58.9 parts of dibutylamine, 65 parts of isopropanol, 32.5 parts of isobutanol and 38.1 parts of toluene are stirred for 15 minutes at 50° C. and then for 2.5 hours at 80° C. 142.1 parts of a diglycidyl ether obtained from bisphenol A and epichlorohydrin, and having an epoxide value of 0.1, and 46.9 parts of toluene are then added. After a further 30 minutes at 75°–80° C., 102.9 parts of a diglycidyl ether obtained from bisphenol A and epichlorohydrin, and having an epoxide value of 0.2, 52.5 parts of a triglycidyl ether obtained from pentaerythritol and epichlorohydrin, and having an epoxide value of 0.62, and 49.9 parts of ethylglycol are added. The mixture is allowed to continue reacting at 70° C. until the viscosity reaches 600 mPa.s (measured by means of an ICI plate-and-cone viscometer at 75° C.). The reaction is then terminated using 2.5 parts of mercaptoethanol. The solids content is 69.3%.

(c) Electrocoating and testing

To prepare a 10% strength coating bath, 100 parts of the solid resin obtained as described under (b), 6 parts of butylglycol, 120 ppm (based on bath volume) of Cu++ as an aqueous copper acetate solution, and 50 ppm of Co++ as cobalt nitrate are mixed thoroughly, protonation is effected with 1.8%, based on solid resin, of acetic acid, and the mixture is diluted to 1,000 parts with fully demineralized water. The coating bath is stirred for 48 hours at 30° C., after which it has a pH of 6.9 and a conductivity of 1,242 $\mu$S.cm$^{-1}$. Finally, 5 parts of isodecanol and 8 parts of butylglycol are added. On phosphatized steel sheets connected as the cathode, deposition for 2 minutes at 270 volt and 30° C., and hardening for 20 minutes at 180° C., gives a 9–11 $\mu$m thick coating having an Erichsen deep-drawing value of 8.8 mm.

The DIN 50,021 corrosion test, carried out for 10 days, gave a penetration of 0.7–3 mm on zinc-phosphatized water-rinsed steel sheets and a penetration of 0.5–2 mm on iron-phosphatized water-rinsed steel sheets, the penetrations being measured from the cut. The loss on baking is about 8%.

COMPARATIVE EXAMPLE

An electrocoating binder is prepared as described in Example 1 of German Published Application DAS No. 2,419,179, but without the addition of the tetramethoxybutyl ether of acetylenediurea, and its loss on baking is determined.

For this purpose, a freshly coated sheet sample is dried under the conditions used when determining the solids content (2 hours at 125° C.) and is then baked under the conventional conditions (20 minutes at 180° C.). The weight loss of the baked sample compared with the dried sample is 11.5%.

We claim:

1. A polyadduct/polycondensate which can be diluted with water when protonated with an acid, contains basic nitrogen groups, and is obtained by the polyaddition reaction of
   (A) from 5 to 90% by weight of a Mannich base obtained from
      (a) a monophenol or polyphenol or a mixture of a monophenol and a polyphenol,
      (b) one or more secondary amines ($b_1$) which contain one or more hydroxyalkyl groups, or a mixture of a secondary amine of this type ($b_1$) with another secondary amine ($b_2$), and
      (c) formaldehyde or a formaldehyde donor, with
   (B) from 10 to 95% by weight of one more epoxy resins, wherein the polyadduct/polycondensate of (A) with (B) contains groups, which are bonded to aromatic rings, of the formula (I)

$$-CH_2-NH-\overset{O}{\overset{\|}{C}}-CHR^3-CHR^4-N\overset{R^1}{\underset{R^2}{\diagdown}} \quad (I)$$

where $R^1$ and $R^2$ are identical or different and are each alkyl of 1 to 9 carbon atoms, or hydroxyalkyl or alkoxyalkyl, each of 2 to 10 carbon atoms, or are linked to one another to form a 5-membered or 6-membered ring, and $R^3$ and $R^4$ are identical or different and each is hydrogen or methyl.

2. A polyadduct/polycondensate as claimed in claim 1, wherein the component (b) used to prepare the Mannich base (A) is either diethanolamine ($b_1$) or a mixture of diethanolamine ($b_1$) and another secondary amine ($b_2$).

3. A polyadduct/polycondensate as claimed in claim 1 or 2, wherein the monophenols or polyphenols, or mixtures of monophenols and polyphenols, used to prepare the Mannich base (A) are
   ($a_1$) one or more mononuclear or polynuclear monophenols or polyphenols, or a mixture of such monophenols and polyphenols, some or all of which is replaced by
   ($a_2$) a mononuclear or polynuclear monophenol or polyphenol, or a mixture of a monophenol and a polyphenol of this type, which contains groups of the formula (I)

$$-CH_2-NH-\overset{O}{\overset{\|}{C}}-CHR^3-CHR^4-N\overset{R^1}{\underset{R^2}{\diagdown}} \quad (I)$$

where $R^1$, $R^2$, $R^3$ and $R^4$ have the above meanings.

4. A polyadduct/polycondensate as claimed in claim 3, wherein a reaction product of a polyepoxide compound with less than the equivalent amount of a mononuclear or polynuclear monophenol and/or polyphenol ($a_2$) is used as component (B).

5. A process for the cathodic electrocoating of metallic articles, wherein the binder used is the polyadduct/polycondensate as claimed in claim 1 or 2.

6. A process for the cathodic electrocoating of metallic articles, wherein the binder used is the polyadduct/polycondensate as claimed in claim 3.

7. A process for the cathodic electrocoating of metallic articles, wherein the binder used is the polyadduct/polycondensate as claimed in claim 4.

* * * * *